(12) United States Patent
Edmiston

(10) Patent No.: US 8,754,182 B2
(45) Date of Patent: *Jun. 17, 2014

(54) SOL-GEL DERIVED SORBENT MATERIAL CONTAINING A SORBATE INTERACTIVE MATERIAL AND METHOD FOR USING THE SAME

(75) Inventor: Paul L. Edmiston, Wooster, OH (US)

(73) Assignee: ABS Materials, Inc., Wooster, OH (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/025,445

(22) Filed: Feb. 11, 2011

(65) Prior Publication Data

US 2012/0032111 A1 Feb. 9, 2012

Related U.S. Application Data

(63) Continuation-in-part of application No. 12/560,002, filed on Sep. 15, 2009, which is a continuation-in-part of application No. 11/537,944, filed on Oct. 2, 2006, now Pat. No. 7,790,830.

(60) Provisional application No. 60/722,619, filed on Sep. 30, 2005.

(51) Int. Cl.
*C08G 77/04* (2006.01)
(52) U.S. Cl.
USPC .......................................... 528/35; 524/588
(58) Field of Classification Search
USPC .......................................... 528/35; 524/588
See application file for complete search history.

(56) References Cited

U.S. PATENT DOCUMENTS

| 2004/0092004 A1* | 5/2004 | Stanford et al. ........... 435/287.1 |
| 2010/0096334 A1 | 4/2010 | Edmiston |
| 2010/0113856 A1 | 5/2010 | Edmiston |
| 2011/0049056 A1* | 3/2011 | Wyndham et al. ............ 210/656 |

FOREIGN PATENT DOCUMENTS

| WO | 2007112242 A1 | 10/2007 |
| WO | 2009 126207 | * 10/2009 |
| WO | 2009126207 | 10/2009 |

OTHER PUBLICATIONS

International Preliminary Examination Report—Application No. 10 757 891.6-1214, European Patent Office—Netherlands, Feb. 7, 2013.
International Search Report—PCT/US2010/048670, International Search Authority—European Patent Office—Sep. 13, 2010 (ABS-019159WO).
Paul L. Edmiston et al; "Absorption of dissolved organic species from water using organically modified silica that swells"; Separation and Purfication Technology, Elsevier Scient, Amsterdam, NL LNKD-DOI: 10.1016/J Seppur.2009.02.001, vol. 66, May 7, 2009, pp. 532-540, XP007915396.

\* cited by examiner

*Primary Examiner* — Kuo-Liang Peng
(74) *Attorney, Agent, or Firm* — Arent Fox LLP

(57) ABSTRACT

Disclosed is a sorbent material formed of a sol-gel derived composition having a porous matrix and a sorbate interactive material incorporated into at least a portion of the sol-gel derived composition, as well as a method for using such sorbent materials.

12 Claims, 5 Drawing Sheets

SOL-GEL DERIVED SORBENT MATERIAL CONTAINING A SORBATE INTERACTIVE MATERIAL AND METHOD FOR USING THE SAME

CROSS REFERENCE TO RELATED APPLICATIONS

This present application is a continuation-in-part of U.S. patent application Ser. No. 12/560,002, filed Sep. 15, 2009 which issued as U.S. Pat. No. 8,367,793 on Feb. 5, 2013, U.S. patent application Ser. No. 12/560,002 is a continuation-in-part of Ser. No. 11/537,944, filed Oct. 2, 2006 which issued as U.S. Pat. No. 7,790,830 on Sep. 7, 2010, which claims priority from U.S. Provisional Appl. No. 60/722,619, filed on Sep. 30, 2005.

STATEMENT REGARDING FEDERALLY FUNDED RESEARCH OR DEVELOPMENT

This invention was made with Government support under National Science Foundation Grant No. 0930371

TECHNICAL FIELD

The present invention relates generally to the chemical arts. More particularly, the invention relates to a sorbent material and a method for using the material.

BACKGROUND OF THE INVENTION

The removal of halogenated organic compounds, such as halogenated aromatic compounds (e.g., chlorobenzenes and chlorophenols) and halogenated aliphatic compounds (e.g., methylene chloride, trichloroethanes and trichloroethylene) from aqueous sources poses serious environmental problems. Typically, such halogenated compounds have been disposed of by separating (e.g., by carbon adsorption or steam stripping with a microporous hollow-fiber membrane) the contaminants from their aqueous environment and then incinerating the contaminants. The incineration of halogenated organic compounds, however, often results in the production of highly toxic by-products, such as dioxins. Alternative techniques for the destruction of halogenated hydrocarbons include biological treatment and chemical dehalogenation.

Chemical dehalogenation methods convert halogenated organic compounds to less toxic non-halogenated compounds. One such process employs a sodium naphthalene reagent to form sodium chloride and an inert sludge. While the sludge can be safely incinerated, the process is complicated by requiring an air-free reaction vessel that limits its application for on-site treatment of contaminated environmental sources. In another approach, a dechlorination reagent is formed by reacting an alkali metal with polyethylene glycol in the presence of heat and oxygen.

The above-mentioned processes, which involve the oxidative dechlorination of halogenated organic compounds, are generally highly sensitive to water. Such processes require a separation step to remove the halogenated compounds from the aqueous environment before they can be treated. In addition, elevated temperatures are often required to carry out the reaction. Thus, these processes have not been widely accepted for the decontamination of environmental sites (e.g., "Superfund" sites).

SUMMARY OF THE INVENTION

Now in accordance with the invention there has been found a sorbent material formed of a sol-gel derived composition having a porous matrix and a sorbent interactive material incorporated into at least a portion of the sol-gel derived composition. And in some embodiments, the a sorbent interactive material is embedded in the porous matrix. In some embodiments, the sol-gel derived composition is swellable to at least 1.5 times its volume.

In some embodiments, the sol-gel derived composition is an aromatically-bridged, organosiloxane sol-gel derived composition, containing a plurality of alkylsiloxy substituents. In some embodiments, the aromatically-bridged, organosiloxane sol-gel derived composition is derived from a trialkoxysilane corresponding to the formula:

$$(\text{alkoxy})_3\text{Si}-(\text{CH}_2)_n-\text{Ar}-(\text{CH}_2)_m-\text{Si}(\text{alkoxy})_3$$

where n and m are individually an integer from 1 to 8, Ar is a single-, fused-, or poly-aromatic ring, and each alkoxy is independently a $C_1$ to $C_5$ alkoxy. In some embodiments, the trialkoxysilane is a bis(trialkoxysilylalkyl)benzene, such as 1,4-bis(trimethoxysilylmethyl)benzene or bis(triethoxysilylethyl)benzene. In some embodiments, the alkylsiloxy substituents correspond to the formula:

$$-O_x-Si-R_y$$

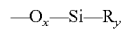

where R is independently a hydrocarbon containing up to about 30 carbons, x is 1 or 2, y is 2 or 3 and the total of x and y is 4 And in some embodiments, the alklysiloxy substituents include at least one heteroatom selected from sulfur, oxygen, nitrogen, phosphorous or halogen atom or combinations thereof.

In some embodiments, the sorbent interactive material is a transition metal, such as iron, copper, nickel, cobalt, silver, gold, palladium, zinc, platinum or ruthenium, including nanoparticulate ruthenium.

The amount of nanoparticulate ruthenium embedded in the porous matrix is typically from about 0.1% to about 10% and in some embodiments from about 0.25% to about 8% and some other embodiments from about 0.5% to about 5% based on the weight of the sol-gel derived composition. The diameter of the sorbent material is typically from about 0.1 nm to 12 nm and in some embodiments from about 1 nm to about 8 nm and in some other embodiments from about 2 nm to about 5 nm.

In some embodiments, the sorbate interactive material reacts with the sorbate. For example, in some embodiments, the sorbate is subject to reduction and the reaction is a reduction reaction.

In alternate embodiments, the sorbate interactive material catalyzes a reaction with the sorbate. For example, in some embodiments, the sorbate is halogenated and the reaction is a dehalogenation reaction.

Now also discovered in accordance with the invention is a method for reducing a sorbate subject to reduction by contacting a sorbate subject to reduction a sorbent material formed of a sol-gel derived composition having a porous matrix and nanoparticulate ruthenium incorporated into at least a portion of the sol-gel derived composition under conditions sufficient to reduce the sorbate. In some embodiments, the nanoparticulate ruthenium is embedded in the porous matrix. And in some embodiments, the sol-gel derived composition is swellable to at least 1.5 times its volume.

In some embodiments, the sol-gel derived composition is an aromatically-bridged, organosiloxane sol-gel derived composition, containing a plurality of alkylsiloxy substituents. In some embodiments, the aromatically-bridged, organosiloxane sol-gel derived composition is derived from a trialkoxysilane corresponding to the formula:

$$(\text{alkoxy})_3\text{Si}-(\text{CH}_2)_n-\text{Ar}-(\text{CH}_2)_m-\text{Si}(\text{alkoxy})_3$$

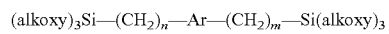

where n and m are individually an integer from 1 to 8, Ar is a single-, fused-, or poly-aromatic ring, and each alkoxy is independently a $C_1$ to $C_5$ alkoxy. In some embodiments, the trialkoxysilane is a bis(trialkoxysilylalkyl)benzene, such as 1,4-bis(trimethoxysilylmethyl)benzene or bis(triethoxysilylethyl)benzene. In some embodiments, the alkylsiloxy substituents correspond to the formula:

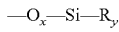

where R is independently a hydrocarbon containing up to about 30 carbons, x is 1 or 2, y is 2 or 3 and the total of x and y is 4 And in some embodiments, the alklysiloxy substituents include at least one heteroatom selected from sulfur, oxygen, nitrogen, phosphorous or halogen atom or combinations thereof.

The amount of nanoparticulate ruthenium embedded in the porous matrix is typically from about 0.1% to about 10% and in some embodiments from about 0.25% to about 8% and some other embodiments from about 0.5% to about 5% based on the weight of the sol-gel derived composition. The diameter of the sorbent material is typically from about 0.1 nm to 12 nm and in some embodiments from about 1 nm to about 8 nm and in some other embodiments from about 2 nm to about 5 nm.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE PREFERRED EMBODIMENTS

Figure 1:
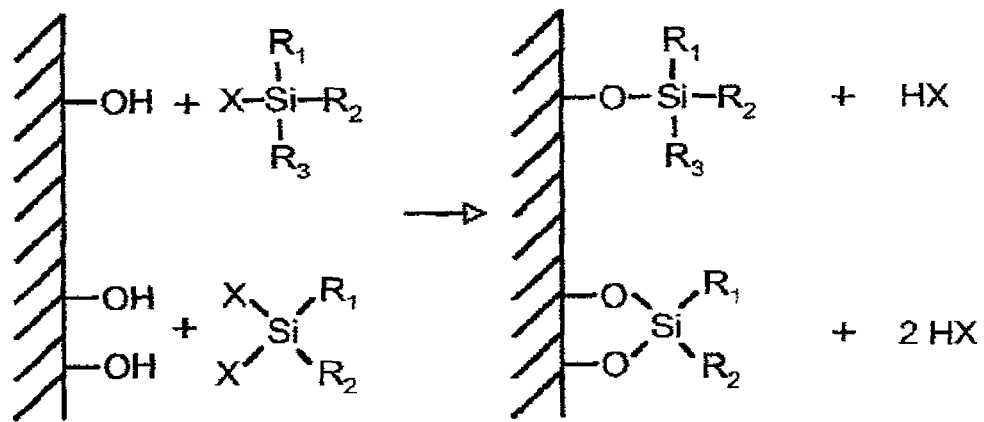
FIG. 1 is a representation of exemplary derivatization reactions used during the preparation of one embodiment of the sorbent material in accordance with the invention.

Particular embodiments of the invention are described below in considerable detail for the purpose of illustrating its principles and operation. However, various modifications may be made, and the scope of the invention is not limited to the exemplary embodiments described below.

Unless otherwise defined, all technical terms used herein have the same meaning as commonly understood by one of ordinary skill in the art to which the present invention pertains.

As used herein, "sorbate" refers to a compound taken up by the sorbent material of the present invention, whether by adsorption, absorption, or a combination thereof. The inventive method is of particular use with sorbates dissolved in aqueous solutions, where the sorbates have a $\log k_{ow} > -0.32$ and a molecular weight less than 1,000,000 and where the sorbates have a $\log k_{ow} > 1.25$ and a molecular weight less than 2,000.

As used herein, "swellable" means increases to at least 1.5 times its volume, when dry, if placed in excess acetone.

As used herein, "nanoparticle" means a particle sized between about 2 and about 500 nanometers in one dimension.

In accordance with the invention, there has been discovered a novel sorbent material for interacting with a sorbate The sorbent material is formed of a sol-gel derived composition having a porous matrix at least a portion of which incorporates a sorbate interactive material. The sorbate interactive material can be, for example, a material that reacts with a sorbate or that catalyzes a reaction with a sorbate.

In some embodiments, the sorbent material is swellable to at least 1.5 times its volume, when dry, in acetone. Preferred sorbent materials are swellable to at least two times their original volume, more preferably at least five times their original volume, and in some embodiments up to about eight to ten times their original volume in a sorbate. The swelling of the sorbent material and the sorption of the sorbate is driven by the release of stored tensile force rather than by chemical reaction.

And in some embodiments, the sorbent material is formed of an aromatically-bridged, organosiloxane, sol-gel derived composition containing a plurality of alkylsiloxy substituents. In such embodiments, the sorbent material contains a plurality of flexibly tethered and interconnected organosiloxane particles having diameters on the nanometer scale. The organosiloxane nanoparticles form a disorganized porous matrix defined by a plurality of aromatically cross-linked organosiloxanes that create a porous structure.

The porous, aromatically-bridged, organosiloxane sol-gel derived compositions contain a plurality of polysiloxanes that include an aromatic bridging group flexibly linking the silicon atoms of the polysiloxanes. Such organosiloxane nanoparticles have a multilayer configuration comprising a hydrophilic inner layer and a hydrophobic, aromatic-rich outer layer.

The sorbent materials are formed of a sol-gel derived composition obtained using a sol-gel reaction beginning with trialkoxysilanes containing an aromatic bridging group. Suitable trialkoxysilanes include, without limitation, trialkoxysilanes corresponding to the formula:

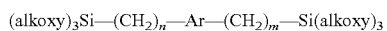

wherein n and m are individually an integer from 1 to 8, Ar is a single-, fused-, or poly-aromatic ring, and each alkoxy is independently a $C_1$ to $C_5$ alkoxy. Bis(trialkoxysilylalkyl)benzenes are preferred and include 1,4-bis(trimethoxysilylmethyl)benzene (BTB), bis(triethoxysilylethyl)benzene (BTEB), and mixtures thereof, with bis(triethoxysilylethyl) benzene being most preferred.

The trialkoxysilanes are preferably present in the reaction medium at between about 0.25M and about 1M, more preferably between about 0.4M and about 0.8M, most preferably between about 0.4M and about 0.6M.

A catalytic solution comprising a stoichiometric amount of water and a catalyst can be rapidly added to the reaction medium to catalyze the hydrolysis and condensation of the trialkoxysilanes. Conditions for sol-gel reactions are well-known in the art and include the use of acid or base catalysts in appropriate solvents. Preferred conditions are those that contain a base catalyst in any suitable solvent. Exemplary base catalysts include, without limitation, tetrabutyl ammonium fluoride ("TBAF"), 1,5-diazabicyclo[4.3.0]non-5-ene ("DBN"), and alkylamines (e.g., propyl amine), of which TBAF is preferred. Suitable solvents for use with the base catalysts include, without limitation, tetrahydrofuran ("THF"), acetone, dichloromethane/THF mixtures containing at least 15% by vol. THF, and THF/acetonitrile mixtures containing at least 50% by vol. THF. Of these exemplary solvents, THF is preferred.

As noted above, acid catalysts can be used to form swellable sol-gels, although acid catalysts are less preferred. Exemplary acid catalysts include, without limitation, any strong acid such as hydrochloric acid, phosphoric acid, sulfuric acid and the like. Suitable solvents for use with the acid catalysts include those identified above for use with base catalysts.

After gellation, the material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under reduced pressure, or in a container or oven.

Solvent and catalyst extraction (i.e., rinsing) is carried out during or after the aging process. Preferred materials for extraction include, without limitation, any organic solvent of medium polarity, including, without limitation, THF, acetone, ethanol, and acetonitrile, either alone or in combination.

As shown in FIG. 1, after rinsing, the sol-gel is characterized by the presence of residual silanols. The silanol groups allow for derivatization of the gel using any reagent that includes both one or more silanol-reactive groups and one or more non-reactive alkyl groups. The derivatization process results in the end-capping of the silanol-terminated polymers present within the sol-gel with alkylsiloxy groups having the formula:

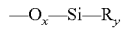

where each R is independently an aliphatic or non-aliphatic hydrocarbon containing up to about 30 carbons, with or without one or more hereto atoms (e.g., sulfur, oxygen, nitrogen, phosphorous, and halogen atoms), including straight-chain hydrocarbons, branched-chain hydrocarbons, cyclic hydrocarbons, and aromatic hydrocarbons, x is 1 or 2, y is 2 or 3 and the total of x and y is 4.

Figure 2:
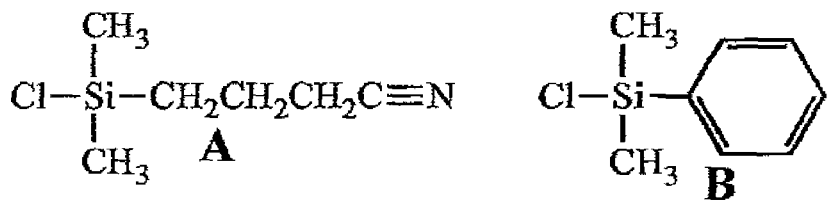
FIG. 2 identifies exemplary chlorosilanes used to derivatize silanols during the preparation of one embodiment of the sorbent material in accordance with the invention.
Figure 2:
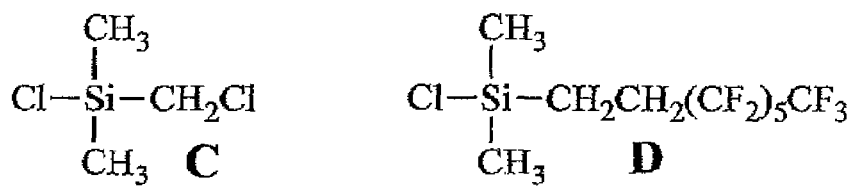
Figure 2:
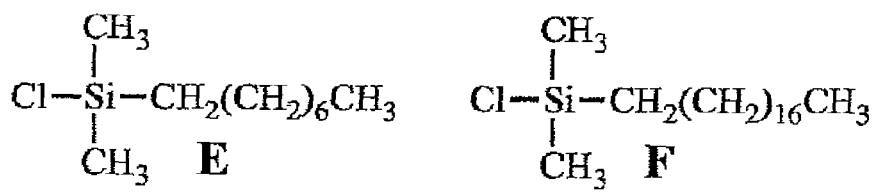

One suitable class of derivatization reagents includes halosilane reagents that contain at least one halogen group and at least one alkyl group R, as defined above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethylchlorosilane, phenyldimethylchlorosilane, chloromethyldimethylchlorosilane, (trideca-fluoro-1,1,2,2-tertahydrooctyl)dimethylchlorosilane, n-octyldimethylchlorosilane, and n-octadecyldimethylchlorosilane. The structures of these exemplary reagents are shown in FIG. 2.

Another suitable class of derivatization reagents includes silazanes or disilazanes. Any silazane with at least one reactive group X and at least one alkyl group R, as defined above can be used. A preferred disilazane is hexamethyldisilazane.

After derivatizing, the reaction mixture is preferably rinsed in any of the rinsing agents described above, and then dried. Drying can be carried out under any suitable conditions, but preferably in an oven, e.g., for about 2 hr at about 60 C to produce the porous, swellable, sol-gel derived composition.

The resulting sol-gel derived composition is hydrophobic, resistant to absorbing water, and swellable to at least 1.5 times its volume, when dry, in acetone. Preferred sol-gel derived compositions are swellable to at least two times their original volume, more preferably at least five times their original volume, most preferably up to about eight to ten times their original volume in acetone. A suitable swellable sol-gel derived composition is Osorb® swellable sol-gel derived composition available from ABS Materials, Wooster, Ohio.

Without being bound by theory, it is believed that swelling is derived from the morphology of interconnected organo-silica particles that are crosslinked during the gel state to yield a nanoporous material or polymeric matrix. Upon drying the gel and following the derivatization step, tensile forces are generated by capillary-induced collapse of the polymeric matrix. This stored energy can be released as the matrix relaxes to an expanded state when a sorbate disrupts the inter-particle interactions holding the dried material in the collapsed state. New surface area and void volume is then created, which serves to further capture additional sorbate that can diffuse into the expanded pore structure.

A sorbate interactive material is incorporated into at least a portion of the porous matrix of the sol-gel derived composition. It is a distinct advantage of the invention, that it is useful with a wide variety of materials that interact with a sorbate in a number of different ways. Representative interactive materials include, but are not limited to, materials that react with the sorbate and materials that catalyze reactions with the sorbate.

Representative sorbate interactive material include, without limitation, interactive metals, such as a transition metals. Useful transition metals include elements with an atomic number of from 21 to 30, from 39 to 48, and from 57 to 80 and include the later transition metals, i.e., the noble metals. Examples of transition metals include iron, including zero valent iron ("ZVI"), copper, nickel, cobalt, silver, gold, palladium, zinc, platinum and ruthenium, with ruthenium being preferred. It is a distinct advantage of sorbate materials containing ruthenium sorbate interactive material that the ruthenium is reactive at pressures and temperatures much lower than are other forms of ruthenium.

Further examples of useful sorbate interactive materials include heterogeneous catalysts, electrocatalysts, and organocatalysts, including biocatalysts, such as enzymes. Still further examples of useful sorbate interactive materials include multifunctional solids that are catalytically active, such as zeolites (e.g., analcime, chabazite, clinoptilolite, hcu-landite, natrolite, phillipsite and stilbite), alumina, and activated/graphitic carbon as well as other reactive transition metals, alloys, metal oxides, ceramics and the like.

The sorbate interactive material is incorporated into at least a portion of the sol-gel derived composition by any suitable method. In some embodiments, the sorbate interactive material is disposed on the sol-gel derived composition, by, for example, forming a thin film on the porous matrix, such as by sputter coating or thermal deposition or e-beam deposition or the like. In other embodiments, the sorbate interactive material is a functional group directly or indirectly chemically bound to at least a portion of the polymer matrix. Still further examples, include weak bases, such as organic amines, fluoride ions, carbonates and phenolates.

In still other embodiments, the sorbate interactive material is a particulate material embedded or dispersed in the porous matrix of the sol-gel derived composition. In such embodiments, the particles typically have a diameter of from about 0.1 nm to 12 nm, preferably from about 1 nm to about 8 nm and more preferably from about 2 nm to about 5 nm. And in such embodiments, the amount of particulate material disposed in the porous matrix is typically from about 0.1% w/v to about 10% w/v, and in some embodiments from about 0.25% w/v to about 8% w/v, and, in some embodiments, from about 0.5% w/v to about 5% w/v based on the sol-gel derived composition.

In some of these embodiments, the sorbate interactive material or a sorbate interactive material precursor is added to the trialkoxysilane containing reaction mixture, prior to the sol-gel reaction. For example, from about 0.01 to about 10 parts of nano-sized zero valent iron ZVI particles can be added into the reaction mixture.

In alternative embodiments, the sorbate interactive material is incorporated into at least a portion of the sol-gel derived composition by treating the sol-gel derived composition with a solution containing the sorbate interactive material or its precursor in a solvent. The solution can be saturated or non-saturated with the sorbate interactive material or its precursor.

The amount of the solution used to treat the sol-gel derived composition is effective to induce swelling of the sot-gel derived composition, typically from about one to about eight times its original volume, thus facilitating the dispersing of the sorbate interactive material or its precursor into at least a portion of the porous structure.

Useful solvents include organic solvents, such as tetrachloroethylene, ethanol, methanol, acetone, methyl acetate, ethyl acetate, and hexane. Alternatively, the solvent can be an alcoholic solution containing a sufficient amount of an alcohol to induce swelling of the sol-gel composition. For example, where the sorbate interactive material is nanoparticulate ruthenium, the sol-gel derived composition can be treated with a saturated solution of ruthenium trichloride dissolved in 95% ethanol and where the sorbate interactive material is nanoparticulate palladium, the sol-gel derived composition can be treated with a saturated solution of palladium acetate or hexchloropalladate dissolved in 95% ethanol.

After treating the sol-gel derived composition with the solution, the sol-gel derived composition is heated (e.g., heated in the range of from about 20 C to about 80 C) to incorporate the sorbate active material in the porous structure and remove any excess solvent. For example, weak acids can be incorporated into the porous matix in this manner.

In another example of the present invention, ruthenium trichloride contained in a saturated solution used to treat a sol-gel derived composition is caused to precipitate and form nanoparticulate ruthenium upon the addition of sodium borohydride powder.

In still another example, a sol-gel derived composition treated with a saturated solution of palladium acetate or hexchloropalladate dissolved in ethanol is heated in the range of from about 30 C to about 60 C. Heating the saturated solution reduces the palladium causing metallic palladium particles to be deposited within the porous structure of the sol-gel derived composition.

In some alternative embodiments, a sorbate interactive material is coated onto a particulate material. In some of these embodiments, the particulate material is inert to the sorbate, while in other embodiments, the particulate material is a second sorbate interactive material. For example, in some embodiments, ZVI nanoparticles are coated with from about 0.01 wt. % to about 0.0001 wt. %, ruthenium, palladium, nickel or zinc to catalytically enhance the rate of reaction.

The sorbate interactive material is deposited or coated on the particulate material, for example, by treating the sol-gel derived composition with a solution containing an appropriate amount of a sorbate interactive material or a sorbate interactive material precursor in a solvent. Representative solvents include an alcohol, such as ethanol, methanol, or isopropanol. In one example, an equal volume of about 50 mM palladium acetate solution is combined with ethanol and then used to treat a sol-gel derived composition containing nano-sized ZVI particles. In this example, the palladium ions are reduced to zero valent palladium by the ZVI, so as to be deposited on to the surface of the nano-sized ZVI particles.

The extent of sorbant active material deposition on the surface of the particulate material is controlled by the total reaction time between the sol-gel derived composition and the solution containing the sorbate interactive material. The reaction time can be from about 30 minutes to about 4 hours. At the desired time, any excess solution containing the sorbate interactive material is removed by successive rinse steps using an alcohol and/or other solvent. The sorbent material is then be dried at about 100 C.

The amount of sorbent interactive material present in the sol-gel derived composition varies based on the particular sorbent interactive material and the particular application. Factors that can influence the amount of sorbent interactive material include the particular sorbate and/or the media (e.g., aqueous solution) containing the sorbate. The amount will be readily determinable by one skilled in the art without undue experimentation. Where the sorbent interactive material comprises ruthenium, for example, the ruthenium is typically present from about 0.25% w/v to about 8% w/v, and, in some embodiments, from about 0.5% to about 5% w/v. Where the sorbent interactive material comprises palladium, for example, the palladium is typically present in the sol-gel derived composition in an amount from about 0.5% w/v to about 3% w/v and, preferably, about 1% w/v. Alternatively, where the sorbent interactive material iron, the iron is present in the sol-gel derived composition from about 25% w/v to about 30% w/v.

In some embodiments, the sorbent material includes other materials or constituents, depending upon the intended use of the sorbent material. For example, where the catalyst comprises an electrocatalyst, the sorbent material can incorporate at least one electrically-conductive material (e.g., at least one electrically-conductive material is disposed on or within the porous structure). Suitable electrically-conductive materials include any material capable of conducting electrical energy. Representative electrically-conductive materials include a plurality of nanowires, such as metallic nanowires (e.g., Ni, Pt, Au), semiconducting nanowires (e.g., Si, InP, GaN), or graphite nanowires that are disposed on or dispersed within the porous structure. The electrically-conductive material can also include at least one electrically-conductive polymer.

The sorbent materials can be used in any suitable form, including in powder or pellet forms. Powdered forms of the sorbent materials are characterized by a high surface area, for example, in the range of about 800 m²/g, which allows for rapid and effective uptake of the sorbate. Depending upon the manner in which grinding of the sorbent materials is carried out to obtain the powdered form, the particle sizes may vary widely. Preferred powdered forms will have a high surface area (e.g., about 800 m²/g) and an average particle size that is less than about 250 µm, for example, between about 50 to about 250 µm.

In some embodiments and in particular those embodiments where the sorbent material is in pellet form, the porous swellable sol-gel derived composition and the interactive material are combined with a binder, such as a polymeric binder. Useful polymeric binders include microcrystalline cellulose and elastomeric polymers. Preferred elastomeric polymers have a glass transition temperature below about 150 C, the temperature at which the sorbent material begins to decompose. For, example, polystyrene is a currently most preferred elastomeric polymer binder. Other suitable thermoplastic elastomers are described in U.S. Pat. Nos. 7,834,093, 7,799,873, 7,799,868, 7,799,869, 7,790,805, 7,786,206, 7,776,968, 7,771,627, 7,744,781, 7,737,206, 7,655,719, 7,462,309, 6,596,792, 6,162,849, 5,194,480, 7,837,901, 7,815,998, 7,645,399, 7,608,342, 7,550,097, 7,402,616, 6,720,369, 4,634,730, 7,834,093, 7,799,873, 7,799,868, 7,799,869, 7,790,805, 7,786,206, 7,776,968, 7,771,627, 7,744,781, 7,737,206 which patents are herein incorporated by reference.

The amount of binder will depend on the particular application and will be readily determinable by one skilled in the art. In some embodiments, the binder is present in an amour of at least 50% and in some embodiments at least 95% and in some embodiments at least 99.5% based on the weight of the sorbent material.

Pellets can be formed in any desired shape and size suitable for their desired application. For example, in some embodiments, a sol-gel solution is poured into a silicone mold before gellation. The solution is then gelled in the mold to produce a pellet having the desired dimensions.

In other embodiments, pellets are prepared by casting the sol-gel derived composition in a die having a desired internal configuration and dimension, which will result in a polymerized sol-gel conforming to the desired size and shape. In such embodiments, the components are combined using any suitable means, such as by combining in a ball mill. The ingredients are then feed into a die using any suitable means such as by using a screw feeder or a gravity feeder. Screw feeders provide the advantage that they crush inked particles to achieve a more favorable size consistency before compacting. In some cases, heat generated by the screw feeding process may be beneficial, for example, by softening a thermoplastic polymer binder prior to casting.

The ingredients are then compressed at a sufficient force, typically from about 1-8 tonnes, for a sufficient time, typically from about five to about ten minutes, to form a pellet. In some embodiments where the binder is a thermoplastic polymer, the die is preheated to a temperature less than the decomposition temperature of the sol-gel derived composition, typically less than about 150 C.

In some embodiments, the sorbent material is disposed on or within a support. Useful supports include any type of solid or semi-solid object capable of directly or indirectly supporting the sorbent material. For example, the support can be any type of container, vessel, or material having at least one surface for supporting the sorbent material. By "directly" it is meant that the sorbent material is in intimate physical contact with at least one support surface. For example, the sorbent material can be attached, bonded, coupled to, or mated with all or only a portion of the at least one surface. By "indirectly" it is meant that the sorbent material is housed by or within the support without being in direct contact with the support. For example, the sorbent material can be afloat in a fluid (e.g., water) that is contained by the support.

In one embodiment of the present invention, the support is a fixed bed reactor (e.g., a packed or fluidized bed reactor) for high flow interaction of sorbate from an aqueous media. The fixed bed reactor contains the sorbent material, in some embodiments encased between two or more layers of a metal or metal alloy (e.g., stainless steel), so that the sorbent material remains stationary or substantially stationary when an aqueous media containing the sorbate is flowed through the reactor. The fixed bed reactor can include at least one inlet through which the aqueous medium containing the sorbate is supplied, and at least one outlet through which aqueous medium discharged.

The fixed bed reactor can have any shape (e.g., cylindrical), dimensions, and orientation (e.g., vertical or horizontal). The fixed bed reactor may be stand-alone or placed directly in-line with the media containing the sorbate to be removed. In some embodiments, the fixed bed reactor additionally includes an inert, non-swelling filler or media (e.g., ground glass) to provide void spaces for swelling of the sorbent material.

In another embodiment of the present invention, the support is a filter having at least one porous membrane entirely or partially formed with, coupled to, bonded with, or otherwise in intimate contact with the sorbent material. In some embodiments, the filter has a sandwich-like configuration formed of the sorbent material disposed on or embedded between first and second porous membranes. Suitable porous membranes include materials (e.g., metals, metal alloys, or polymers) having pores of sufficient size to permit passage of the sorbent material. For example, the porous membrane can be comprised of a nano- or micro-sized polymers or polymer-blended materials, such as a nano-sized nylon-polyester blends.

In another embodiment of the present invention, the support is a vessel for holding the aqueous medium containing the sorbate to be removed. Suitable vessels include stirred tanks or vats. The sorbent material is disposed on or embedded within at least one surface of the vessel. Alternatively, the sorbent material floats or is suspended in aqueous medium containing the sorbate contained within the vessel.

The sorbent material is contacted with the sorbate so that intimate contact is made between the sorbent material and the sorbate. If desired, the mixture, can be agitated to facilitate intimate contact between the sorbent material and the sorbate. Upon contact with the sorbate, stored energy in the s sorbent material is released as the porous structure relaxes to an expanded state as the sorbate disrupts the inter-particle interactions holding the sorbent material in the unswollen state. New surface area and void volume is then be created, which serves to expose additional sorbate interactive material incorporated in the porous structure.

The sorbent material can be contacted with the sorbate until interaction with substantially all of the sorbate has occurred or until the sorbent material has become saturated with the sorbate. In those embodiments, where the sorbate or the sorbate reaction product is bound to the sorbent material and the mixture includes an aqueous component, the sorbate or sorbate reaction product can be removed from the aqueous component along with the sorbent materiel. For example, the sorbent materiel can be directly removed or collected (e.g., using tactile means) from a support structure or, alternatively, be removed from the aqueous component via centrifugation, filtration or floatation. Removal of the sorbent materiel leaves behind an aqueous component that is substantially free of the sorbate. The remaining aqueous component can then be cleanly collected by pouring, aspiration, evaporation, distillation, or other means known in the art.

The sorbent material can interact with essentially all of the sorbate in the mixture. If complete removal is desired, the mixture can be contacted with enough of the sorbent material to avoid complete saturation of the material or destruction of the sorbate interactive material. Alternatively, the mixture can be repeatedly contacted with fresh sorbent material until substantially complete interaction with all the sorbate has been accomplished.

It is an advantage of the inventive composition and process that, in some embodiments, the sorbent material is regenerated or recovered via evaporation, rinse/drying, and/or chemical treatment. For example, the sorbent material can be heated for a period of time and at a temperature sufficient to separate the sorbate or sorbate reaction product from the porous structure of the sorbent material. The resulting regenerated sorbent material is then available for additional sorbate interaction.

The inventive method is useful for a large number of sorbent interactions, including without limitation, reactions with the sorbate interactive material and reactions catalyzed by the sorbate interactive material. Representative reactions include hydrogenation, hydrogenolysis, rearrangement, isomerisation, Rosemund, hydrogen transfer, deprotection, and debenzylation reactions. For example, nanoparticute ruthenium and palladium are of use in sorbate reduction reactions.

Additional reactions include the production of chemical products or byproducts via select chemical reactions (e.g., polymerization or reduction/oxidation reactions). Catalytic sorbate interactive materials such as palladium, nickel and copper are of use in cross coupling reactions. As one example, copper sorbate interactive material can be used to catalyze azide alkyne Huisgen cycloaddition reactions, such as:

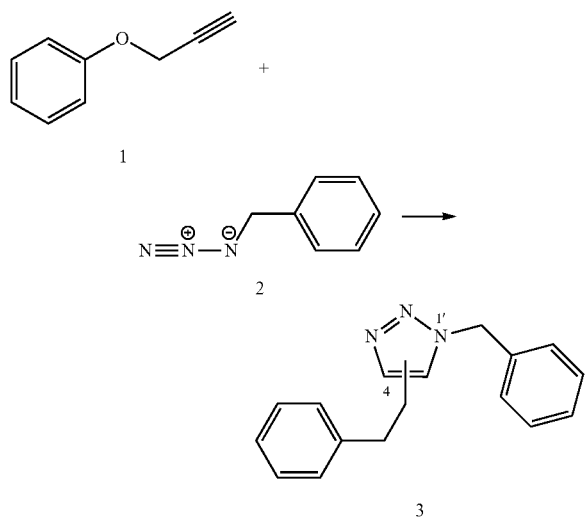

As another example, palladium sorbate interactive material can be used to catalyze the Heck reaction—the chemical reaction of an unsaturated halide with an alkene to form a substituted alkene in the presence of a base. Following is a representation of a palladium catalyzed Heck reaction:

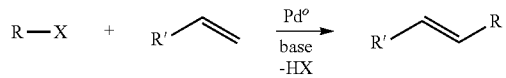

In some embodiments the reaction is a dehalogenation reaction, such as the dehalogenation of contaminants, including halogenated sorbate contaminants found in soil and water. Examples of halogenated sorbate contaminants include tetrachloride (PCE), carbon tetrachloride (CT), trichloroethane (TCE), trichloromethane (TCM), cis 1,2-dichloroethene (cDCE), tribromomethane (TBM), trans 1,2-dichloroethene (tDCE), 1,2-dibromoethane (12EDB), 1,1-dichloroethene (11DCE), trichlorofluoroethane (Freon 113), vinyl chloride (VC), trichlorofluoromethane (Freon 11), hexachloroethane (HCA), 1,1,2,2-tetrachloroethane (1122TeCA), 1,2,3-trichloropropane (123TCP), 1,1,1,2-tetrachloroethane (1112TeCA), 1,2-dichloropropane (12DCP), 1,1,1-trichloroethane (111TCA), lindane, 1,1,2-trichloroethane (112TCA), hexachlorobutadiene (HCBD), 1,1-dichloroethane (11DCA), polychlorinated biphenyls having the formula $C_{12}H_{10-x}Cl_x$ where x is an integer >1 and <11, organochlorine pesticides, such as atrazine, or halogenated species used as chemical weapons, such as ethyldichloroarsine or phosgene. The end products of the dehalogenaton reaction are hydrocarbons and halide ions. Useful sorbate interactive materials for dehalogenation reactions include ZVI.

The reaction by which ZVI reduces TCE is shown below:

$$C_2HCl_3 + 4Fe^0 + 5H^+ \rightarrow C_2H_6 + 4Fe^{2+} + 3Cl^-$$

Immediately after introduction into water, the sorbent material absorbs TCE, thereby causing swelling of the sorbent material. Once TCE is absorbed, TCE remain in intimate contact with the nano-sized ZVI particles distributed throughout the sorbent material. Contact with the nano-sized ZVI particles leads to reductive chlorination reaction of the TCE. Protons for the reductive chlorination reaction can come from either tightly absorbed water left over during synthesis, or from co-absorbed organic acids that are either naturally occurring or injected with the sorbent material (e.g., biodegradable surfactants or modifying agents).

The dechlorination reaction proceeds until the resulting final products, i.e., ethylene and chloride ions are created. Ethylene is gaseous and diffuses from the sorbent material to create space for additional TCE. Chloride ions are charged and migrate from the sorbent material via a thermodynamic driving force to dissolve in the surrounding aqueous medium. The cycle of absorption-reaction-desorption can continue until the entrapped ZVI is depleted, although the sorbent material can continue to absorb TCE.

In other embodiments, the reaction is a reduction reaction, such as the reduction of alcohols, including methanol, and the reduction of contaminants, including halogenated sorbate contaminants such as the halogenated sorbates identified above. The end products of the reduction reaction halogenated organic sorbates are hydrocarbons and halide ions. Other substances susceptible to reduction, include nitroaromatic compounds, such as trinitrotoluene. Useful sorbate interactive materials for reduction reactions include ruthenium, copper and palladium.

In such embodiments, a reducing agent is also present. The reducing agent used will depend upon the particular sorbent interactive material. Where the catalyst comprises palladium, for example, the reducing agent can include hydrogen gas. Other examples of reducing agents are known in the art and include ferrous iron, lithium aluminum hydride, sodium amalgam, sodium borohydride, sulfite compounds, hydrazine, diisobutylaluminum hydride, Lindlar catalyst, oxalic acid and formic acid.

And some embodiments include more than one sorbate reactive material. For example, in one preferred embodiment, the sol-gel derived material includes ZVI particles coated with palladium.

In those embodiments where the sorbent material is for the remediation of a sorbate contaminated soil or water, to account for the hydrophobicity of the sorbate material, the sorbate material can be mixed with at least one of a biodegradable surfactant or modifying agent that facilitates administration of the composition into water or soil. Examples of biodegradable surfactants or modifying agents include sodium dodecylsulfate, organic acids (e.g., citric and acetic acid), and ethanol. Acidic modifying agents, which are also sorbates, (e.g., citric acid and acetic acid) provide the added benefit of being co-absorbed by the swellable composite and providing a proton source for dechlorination reactions. For example, a slurry can be formed using about 1 part of the sorbent material, about 3-5 parts of biodegradable surfactant or modifying agent, and about 10-20 parts water.

The sorbent material is contacted with the contaminated fluid or soil using any appropriate technique and/or equipment. In those embodiments, where the contaminated soil is an aquifer polluted with a halogenated sorbate, for example, a slurry containing sorbent material is directly injected into the soil using standard equipment and methods, such as sonic drilling or hydraulically-powered percussion/probing (e.g., GEOPROBE, Geoprobe Systems, Salina, Kans.). The amount of slurry to be contacted with the contaminated soil or fluid will depend upon the concentration of the sorbate and/or the volume of fluid or soil to be remediated. Upon contact with the contaminated fluid or soil, the sorbates are extracted into the sorbent material and interact with the sorbent interactive material.

In some embodiments, a tank or vat is used as a support for the sorbent material in the extraction of sorbates from a contaminated aqueous solution. Either prior to, simultaneous with, or subsequent to addition of the contaminated aqueous solution to the fillable tank or vat, an amount of the sorbent material is added to the fillable tank or vat. The contaminated aqueous solution is then be mixed thoroughly using mechanical means or through fluid agitation (e.g., a vortex system). Contact of the sorbent material with the contaminated aqueous solution causes the sorbate to be sorbed by the swellable sol-gel composition. As the sol-gel derived composition sorbs the sorbate and becomes swollen, the swollen sorbent material is removed from the fillable tank or vat via floatation, filtration, and/or centrifugation. The removed sorbent material can then be regenerated (e.g., using thermal treatment) and, if necessary, added to the finable tank or vat to remove additional sorbate.

Figure 3:
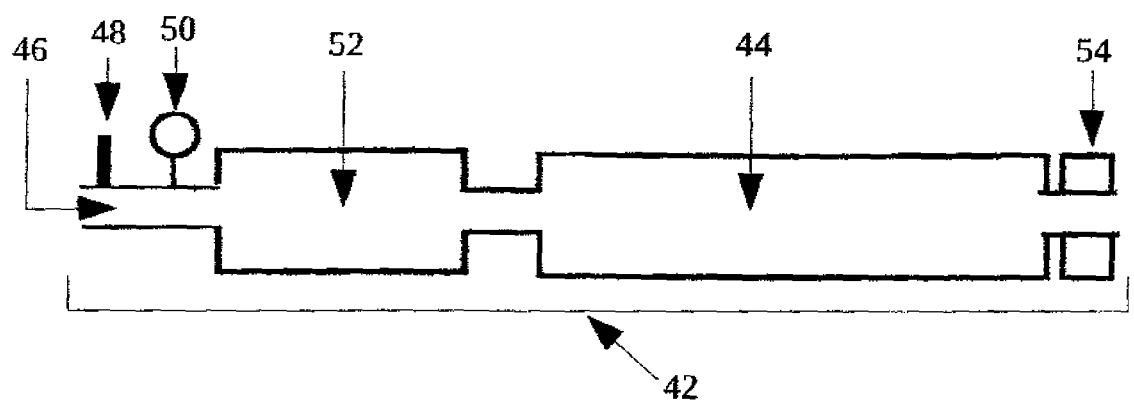
FIG. 3 is a schematic illustration showing a column for extracting a sorbate from a fluid in accordance with the present invention.

FIG. 3 illustrates another example of the present invention in which the support structure is a column 42. The column can have any shape (e.g., cylindrical), dimensions, and orientation (e.g., vertical or horizontal). The column may be stand-alone or placed directly in-line with a fluid containing the sorbate.

The column 42 contains sorbent material disposed in a main body portion 44 thereof. In some embodiments, the sorbent material is held in the column by steel wool, so that the sorbent material remains stationary or substantially stationary when a fluid (e.g., an aqueous solution) containing a sorbate is flowed therethrough. The column includes first inlet 46 in fluid communication with the main body portion through which a fluid containing the sorbate is supplied and a second inlet 48 in fluid communication with the main body portion through which a reducing gas is supplied to the main body portion. The embodiment shown in FIG. 3 includes a pressure gage 50 for measuring the pressure of the fluid as it enters the main body portion and a filter 52 containing sand or gravel to catch large particles and facilitate the dissolution of the hydrogen before the fluid enters the main body portion. The column has an outlet 54 through which the fluid, substantially free of the sorbate, is discharged.

The column 42 can be used, for example, for high flow remediation of a contaminated water source by the palladium catalyzed reduction of TCE. The column is placed directly in-line with a contaminated water source. For example, the column is placed in-line with a contaminated water source that is constantly fed from a petroleum-producing facility. The contaminated water is flowed through the inlet 46 of the column while hydrogen gas produced by a hydrogen gas generator (not shown) flows through the second inlet 48. The contaminated fluid then flow across the filter 52 and into the main body portion 44 where rapid reduction catalyzed by the palladium containing sorbent material occurs. Reduction proceeds until the final products, i.e., ethane and chloride ions are produced. Ethane is gaseous and can diffuse from the sorbent material to create space for interaction with additional TCE. Chloride ions migrate from the sorbent material via a thermodynamic driving force to dissolve in the surrounding aqueous medium. As the contaminated water is flowed through the column, oxygen gas can be flowed into the second outlet to purge excess hydrogen from the reactor. The water discharged from the outlet 54 of the column is substantially free of TCE. As the sol-gel derived sorbent material sorbs TCE from the water, the swollen material can be removed from the column, regenerated (e.g., using thermal treatment), and then replaced (if needed) to continuously remove additional TCE.

The following example is for the purpose of illustration only and is not intended to limit the scope of the claims, which are appended hereto.

EXAMPLES

Example 1

Laboratory experiments have shown that a swellable composite containing ZVI (ZVI-composite) is highly effective in dechlorinating TCE and other species in aqueous solution. Aqueous solutions of 5 ppm TCE were used. To one solution, 0.05% w/v of nano ZVI was added (ZVI-composite). To the other, 0.05% w/v of a ZVI-composite with 0.001% Pd was added (ZVI-Pd-composite). A ZVI-Pd-composite with 3.times.w/w of citric acid added as a slurry agent (ZVI-Pd-composite+citric acid) was also tested. The solution was capped with a septum and the TCE measured at periods of time using solid-phase microextraction with gas chromatography mass spectroscopy (GC-MS). Detection was done using selected ion mode for maximum selectivity and sensitivity. The concentration of TCE was determined using a calibration curve measured in the same way as the TCE test solutions.

Figure 4:
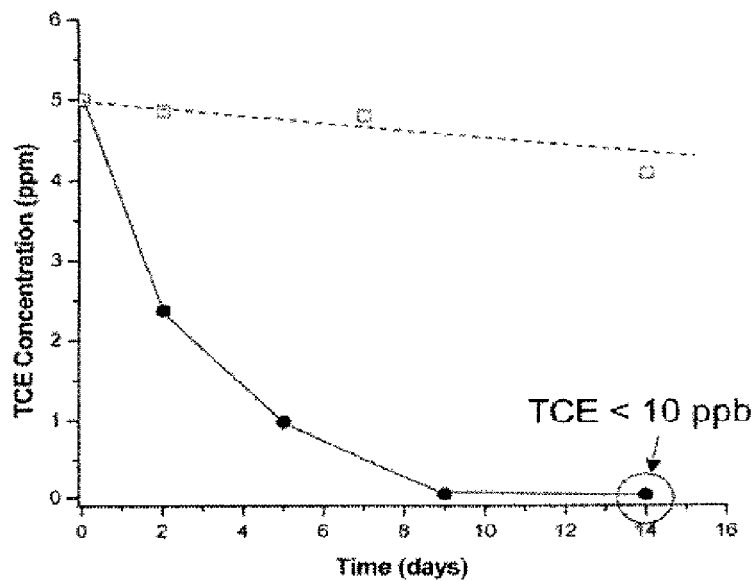
FIG. 4 is a plot of trichloroethylene ("TCE") concentration (ppm) versus time (days).
Figure 6:
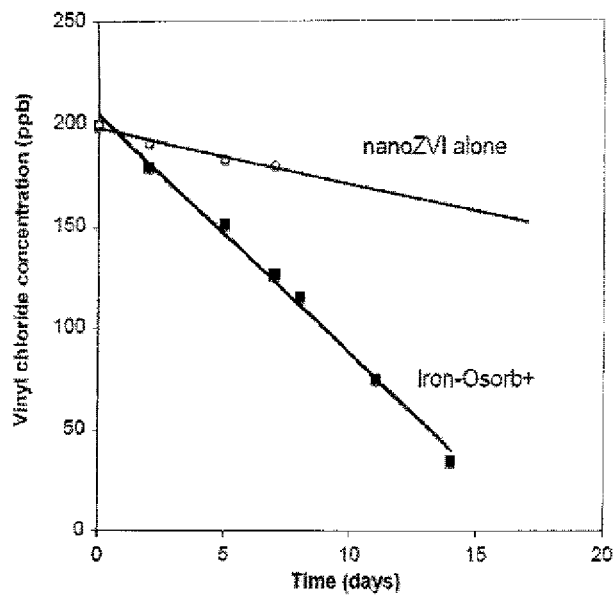
FIG. 6 is a plot of vinyl chloride concentration (ppm) versus time (days) showing reductive dechlorination of vinyl chloride with ZVI alone (empty circles) and a ZVI swellable composite plus palladium (solid squares).

In unstirred aqueous-phase conditions, TCE concentrations drop greater than 99% when using the ZVI-composite. This TCE concentration drop is several orders of magnitude greater than an equivalent mass of ZVI alone. Using environmentally relevant concentrations, the ZVI-composite was found to reduce TCE concentrations from 100 ppb to less than 5 ppb in 7 days under stirred condition and upon addition of 0.0025% w/v of the composite to aqueous solution (FIG. 6). In side-by-side comparisons with ZVI alone, a ZVI-composite that included palladium as a metal catalyst (ZVI-Pd-composite) showed a 10-100.times. greater rate of dechlorination in unstirred solution (FIG. 4).

Functional capability for vinyl chloride and the various isomers of dichloroethylene has been demonstrated in aqueous solution. Bench-scale groundwater remediation experiments have been performed in soil water columns under flowing conditions: a 0.05% ZVI-Pd-composite was dispersed in a soil water mixture. Under constant flow, the concentration of TCE was reduced from 200 ppb (inlet) to less than 5 ppb on outlet. After extended times, the concentration of TCE was reduced to about 1 ppb. This is likely due to expansion of the composite, which demonstrates greater absorption ability as organic absorbates begin to swell the matrix. Static soil-water batch experiments also have demonstrated that TCE concentrations are rapidly reduced over time upon addition of ZVI-composite materials.

Figure 5:
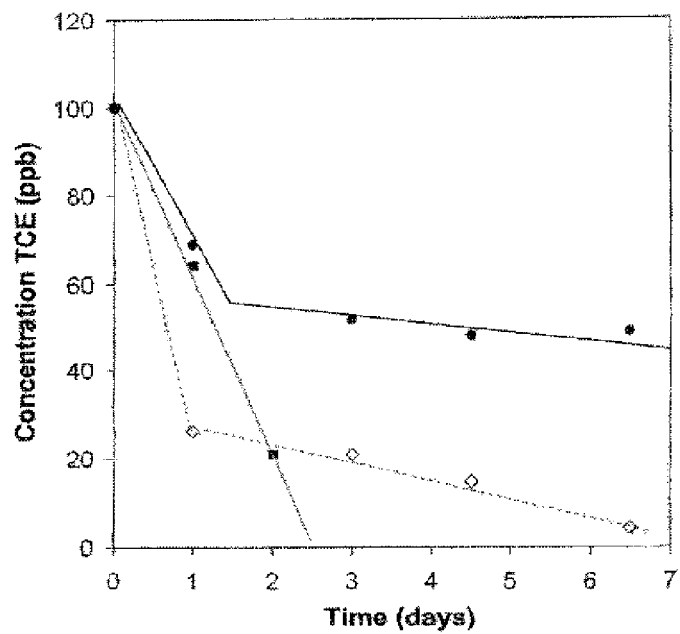
FIG. 5 is a plot of TCE concentration (ppm) versus time (days) showing in situ TCE dechlorination with a swellable composite with 4% nZVI (solid circles), a swellable composite with 4% nZVI and 0.001% palladium catalyst (solid squares), and a swellable composite with 4% nZVI, 0.001% palladium catalyst, and 3× w/w of citric acid (empty diamonds).

As shown in Table 1 and FIG. 5, the addition of metal catalysts (e.g., palladium) and the addition of organic acids increase the rate of dechlorination. Solutions were gently shaken between measurements to ensure good mixing. Time to reach the maximum contaminant level (MCL) was done by measuring the rate of TCE concentration decrease and calculating the days required to go below 5 ppb (EPA MCL level). Materials were added to solution at 0.05% w/v.

TABLE 1

Rate of TCE dechlorination by ZVI composite materials

| Remediation Material[#] | Percent Initial Extraction | Days to Reach MCL (5 ppb) |
| --- | --- | --- |
| Swellable sol-gel composition only | 66 | n/a |
| ZVI-composite | 62 | 34 |
| ZVI-Pd-composite | 60 | 7 |
| ZVI-Pd-composite + citric acid | 40 | <5 |

[#]25 mg material added to 1 L of water contaminated with 100 ppb TCE.

Example 2

A 1 m glass column was filled with 500 g of sand and gravel to which 250 mg of a swellable composite-nZVI-0.001% palladium catalyst was mixed by hand. The packed column was wetted with water containing 200 ppb TCE. Water contaminated with 200 ppb was pumped into the column at a constant flow rate so that it would flow at 0.5 m per day (to simulate groundwater movement). The output from the column was captured in a syringe so that the solution would not be exposed to air (prevents TCE outgassing, which would bias the measurements). Samples from the syringe (output) were tested to determine TCE concentration by the solid phase microextraction GC-MS method. The concentration of the TCE exiting the column was 4.8 ppb after one day, 0.15 ppb after two days and 0.37 ppb after three days.

Example 3

Figure 7:
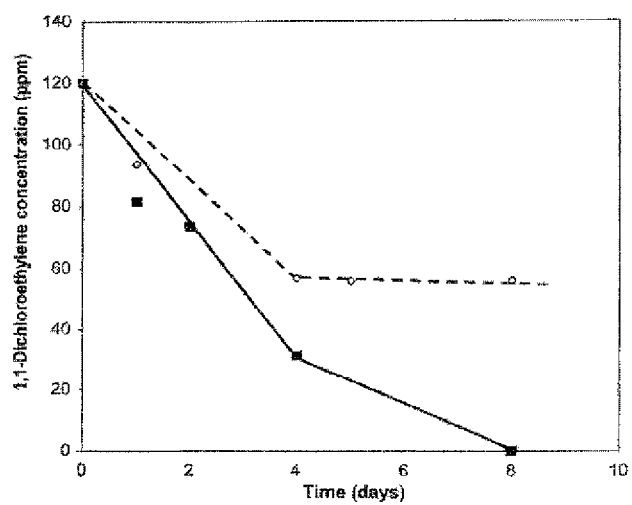
FIG. 7 is a plot of 1,1-Dichloroethylene (1,1-DCE) concentration (ppm) versus time (days) showing reductive dechlorination of 1,1-DCE with ZVI alone (empty circles) and a ZVI swellable composite plus palladium (solid squares).
Figure 8:
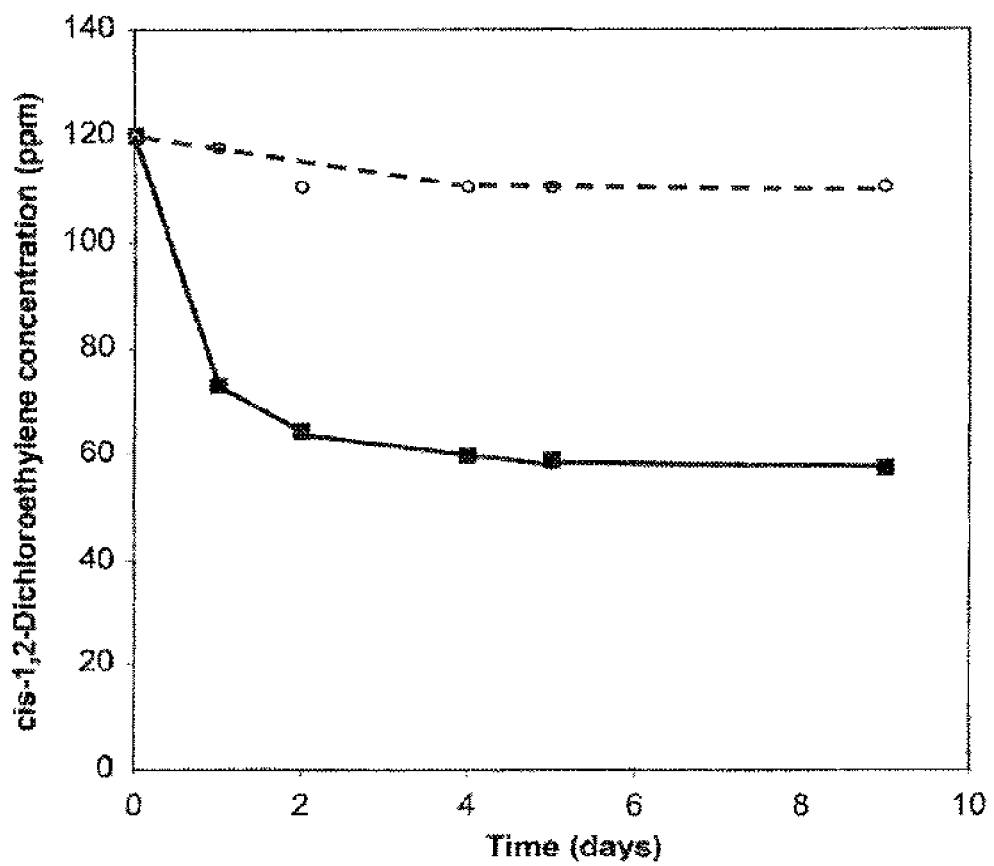
FIG. 8 is a plot of cis-1,2-Dichloroethylene (cis-1,2-DCE) concentration (ppm) versus time (days) showing reductive dechlorination of cis-1,2-DCE with ZVI alone (empty circles) and a ZVI swellable composite plus palladium (solid squares).

FIGS. 6-8 illustrate reactivity of either nZVI alone (empty circles) or a swellable composite with 4% nZVI and 0.001% palladium catalyst (solid squares) to vinyl chloride (FIG. 8), 1,1-Dichloroethylene (1,1-DCE) (FIG. 9), and cis-1,2-dichloroethylene (cis-1,2-DCE) (FIG. 10). Vinyl chloride, 1,1-DCE, and cis-1,2-DCE are the daughter products or intermediates of TCE dechlorination that are often found in groundwater along with TCE. Solutions were made that contained an initial concentration of the dissolved chlorinated species. To one solution was added nZVI, and to another was added the swellable composite with 4% nZVI and 0.001% palladium catalyst. The containers were sealed with a septum to sample without opening the system to the air. The concentration of each species in each solution was measured over time using solid phase microextraction with GC-MS (selective ion mode).

Example 4

1 L bottles were filled with sand and gravel saturated with 100 ppb TCE in water. Small water samples (10 mL) were extracted each day for 10 days. After each sample aliquot was taken, the small volume removed was replaced with 100 ppb TCE solution to ensure there was no headspace in the system. The concentration in the samples was measured by solid phase microextraction GC-MS (selective ion mode). The TCE concentration of nanoZVI alone was 100 ppb after 1 day and 76 ppb after 30 days. The TCE concentration of the swellable composite with 4% nZVI and 0.001% palladium catalyst was 53 ppb after 1 day and 8 ppb after 30 days.

From the above description of the invention, those skilled in the art will perceive improvements, changes and modifications. Such improvements, changes, and modifications are within the skill of the art and are intended to be covered by the appended claims.

Example 5

Sorbent material containing nanoparticulate ruthenium was made by swelling Osorb® sol-gel derived composition with a 1 mg/mL solution of $RuCl_3$ in 95% ethanol. After the sol-gel derived composition had swollen to five times its original volume, sodium borohydride powder was added causing the precipitation of elemental ruthenium and the incorporation of ruthenium nanoparticles into the sol-gel derived composition.

Four grams of the resulting sorbent material was placed in a column. Fifteen parts per million toluene in deionized water was added to the column at 3 mL/min over 62 hours. The temperature was 30 C. The water contained dissolved hydrogen as a hydrogen source. During this time, no toluene was detected in the eluent.

The pH, oxidation-reduction potential (ORP) and conductivity of the input and the output of the column were measured. During the 62 hour run, there was a continuous increase in pH (7.7 to >8.2), a 50% decrease in conductivity, and a 100 mV increase in ORP indicating a decrease in hydrogen and hydrogen ion concentration, characteristic of a hydrogenation reaction.

After the 62 hour run, the sorbent material was removed from the column and the sorbate extracted from the sorbent material using dichloromethane. Gas chromatography of the extract showed that 50% of the toluene had been hydrogenated to produce methylcyclohexane.

The experiment was repeated, except that the temperature was 50 C. Gas chromatography showed that 90% of the toluene had been reduced to methylcyclohexane.

From the above description of the invention, those skilled in the art will perceive improvements, changes and modifications. Such improvements, changes, and modifications are within the skill of the art and are intended to be covers by the appended claims.

I claim:

1. A sorbent material comprising:
   an aromatically-bridged, organosiloxane sol-gel composition, containing a plurality of alkylsiloxy substituents, and
   a sorbate interactive material incorporated into at least a portion of the sol-gel composition.

2. The sorbent material of claim 1, wherein the alkylsiloxy substituents correspond to the formula:

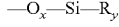

where R is independently a hydrocarbon containing up to about 30 carbons, x is 1 or 2, y is 2 or 3 and the total of x and y is 4.

3. The sorbent material of claim 2, wherein the alklysiloxy substituents include at least one heteroatom selected from sulfur, oxygen, nitrogen, phosphorous or halogen atom or combinations thereof.

4. The sorbent material of claim 1, wherein the sorbate interactive material is a transition metal.

5. The sorbent material of claim 4, wherein the transition metal is iron, copper, nickel, cobalt, silver, gold, palladium, zinc, platinum or ruthenium.

6. The sorbent material of claim 1, wherein the sorbate interactive material is capable of reacting with the sorbate.

7. The sorbent material of claim 1, where the sorbate interactive material catalyzes a reaction with the sorbate.

8. The sorbent material of claim 7, wherein the sorbate is halogenated and the reaction is a dehalogenation reaction.

9. The sorbent material of claim 1, wherein the aromatically-bridged, organosiloxane sol-gel composition is derived from a trialkoxysilane starting material corresponding to the formula:

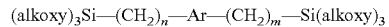

where n and m are individually an integer from 1 to 8, Ar is a single-, fused-, or poly-aromatic ring, and each alkoxy is independently a $C_1$ to $C_5$ alkoxy.

10. The sorbent material of claim 9, wherein the trialkoxysilane is a bis(trialkoxysilylalkyl)benzene.

11. The sorbent material of claim 10, wherein the bis(trialkoxysilylalkyl)benzene is 1,4-bis(trimethoxysilylmethyl)benzene or bis(triethoxysilylethyl)benzene.

12. The sorbent material of claim 9 wherein n and m are individually an integer from 1 to 3, Ar is a phenyl, biphenyl or naphthyl ring and each alkoxy is independently a $C_1$ to $C_3$ alkoxy.

* * * * *